(12) United States Patent
Haque et al.

(10) Patent No.: US 7,613,225 B1
(45) Date of Patent: Nov. 3, 2009

(54) SYSTEM AND METHOD FOR SECURE COMMUNICATION OF COLLECTED AMPHIBIOUS DATA

(75) Inventors: Jamal Haque, Tampa, FL (US);
Richard A. Daigler, Tampa, FL (US);
Edward R. Prado, Palm Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 727 days.

(21) Appl. No.: 11/352,002

(22) Filed: Feb. 10, 2006

(51) Int. Cl.
*H04B 1/00* (2006.01)

(52) U.S. Cl. .................................................. 375/141

(58) Field of Classification Search ............... 375/130, 375/140, 141, 142, 143, 144, 145, 146, 147, 375/219, 220, 295, 316, 324; 380/28; 713/189, 713/190; 340/5.26
See application file for complete search history.

(56) References Cited

U.S. PATENT DOCUMENTS

| 7,002,470 | B1* | 2/2006 | Miao ..................... 340/539.22 |
| 2003/0063025 | A1* | 4/2003 | Low et al. .................... 341/157 |
| 2006/0103535 | A1* | 5/2006 | Pahlaven et al. ......... 340/572.1 |
| 2006/0233276 | A1* | 10/2006 | Green ........................ 375/267 |
| 2007/0087756 | A1* | 4/2007 | Hoffberg .................... 455/450 |

* cited by examiner

*Primary Examiner*—Sam K Ahn
(74) *Attorney, Agent, or Firm*—Fogg & Powers LLC

(57) ABSTRACT

A system for secure communication of collected data is provided. The system comprises a data dissemination subsystem, the data dissemination subsystem operable to store and disseminate collected data. The system also comprises a transmitter subsystem coupled to said data dissemination subsystem, said transmitter subsystem operable to encrypt said disseminated collected data, encode said encrypted data to form a plurality of ultra wideband signals, spectrum spread said plurality of ultra wideband signals with a direct sequence spectrum spreading code, and transmit said spread plurality of ultra wideband signals.

21 Claims, 3 Drawing Sheets

SYSTEM AND METHOD FOR SECURE COMMUNICATION OF COLLECTED AMPHIBIOUS DATA

FIELD OF THE INVENTION

The present invention relates generally to the data communications field, and more specifically, but not exclusively, to a system and method for secure communication of collected amphibious data.

BACKGROUND OF THE INVENTION

Amphibious or underwater data collection platforms (e.g., underwater sensors, submarines, diving craft, etc.) have to transmit collected data (e.g., image data, sensor data, sonar data, etc.) to remote locations having mission computer systems that process and analyze the gathered data. A typical amphibious data collection approach used is to continually gather and store data, and periodically dump the stored data for transmission to the mission computer system. In a non-hostile environment, the collected data can be transmitted (encrypted or unencrypted) in the open to a receiving station via a wireless data communications link. As such, in a non-hostile environment, wireless data communications provides a practical and effective data communication medium. However, in a high threat level, hostile environment (e.g., covert mission in an international setting), the security of the collected data has to be assured, and the transmission of the collected data has to be immune from eavesdropping and/or the effects of electronic countermeasures (e.g., jamming) that a hostile party may employ. A problem with the existing wireless data communication systems is that the wireless data transmission technologies available are not designed with suitable security for covert or other hostile applications, and the wireless data communication systems being used are operated in crowded, unlicensed frequency bands. Consequently, today's wireless data communication systems are highly susceptible to signal interference (e.g., jamming) and eavesdropping. Therefore, a pressing need exists for a system and method that can provide secure communication of collected amphibious data, which is immune from eavesdropping, jamming and other hostile communication or electronic countermeasure techniques that a second party may employ. As described in detail below, the present invention provides such a system and method, which resolve the above-described data communication security problems and other related problems.

SUMMARY OF THE INVENTION

The present invention provides a system and method for secure communication of collected amphibious data, which uses direct-sequence, spread spectrum, ultra wideband (DS-SS UWB) communications to enhance the security of the collected amphibious data during transmission over a wireless communication link. The UWB technique used transmits the collected data using very short pulses with low duty cycles. Thus, the power of the transmitted signals can be distributed evenly over a very large bandwidth, and buried within the environmental noise (below the noise floor) to produce "stealth" transmissions. The transmitted signals can also be encrypted, which provides a wireless data communication transmission that is immune from jamming and masked from eavesdropping attempts. In accordance with a preferred embodiment of the present invention, a system for secure communication of collected amphibious data is provided, which includes a DS-SS UWB transmitter and receiver. The DS-SS UWB transmitter includes a data input unit, a data encryption unit, a UWB encoder unit, a DS spectrum spreader function unit, and a power amplifier unit. The DS-SS UWB receiver includes a receiver front end unit, a data decryption unit, a DS spectrum despreader function unit, and a receiver filter unit. In a second embodiment, the DS-SS UWB transmitter and receiver are combined to provide a DS-SS UWB transceiver.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
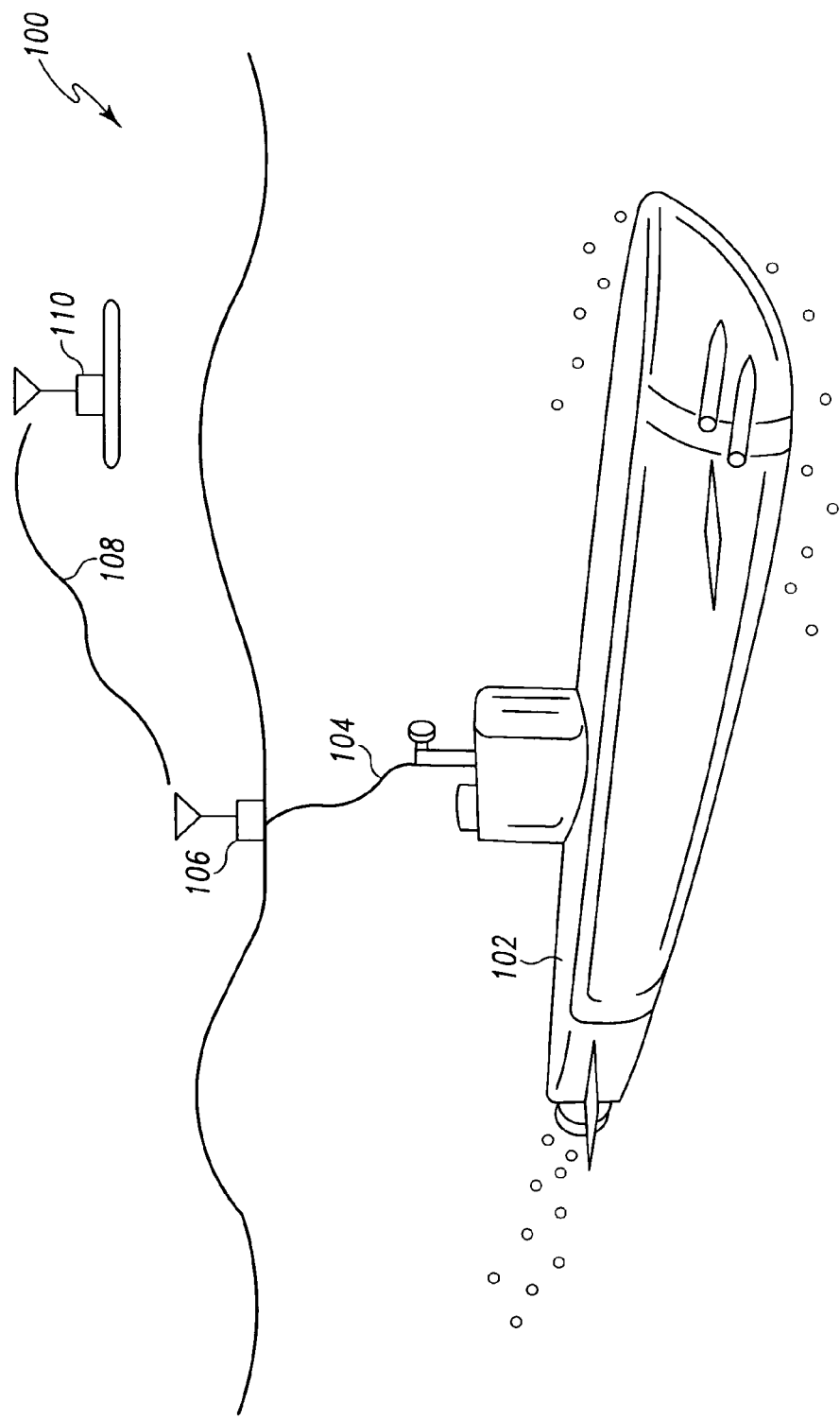
FIG. 1 depicts a pictorial representation of an example amphibious data collection and transmission system, which can be used to implement a preferred embodiment of the present invention.

With reference now to the figures, FIG. 1 depicts a pictorial representation of an example amphibious data collection and transmission system 100, which can be used to implement a preferred embodiment of the present invention. For this example embodiment, system 100 includes an underwater platform (e.g., submarine) 102 that can be used to collect and disseminate amphibious data. However, although a submarine is shown in FIG. 1 as an underwater platform for the collection and dissemination of data, the present invention is not intended to be so limited and can include any suitable medium (e.g., underwater sensor system, diving system, diver, etc.) that is capable of collecting, storing and disseminating collected amphibious data. As shown, the underwater platform (e.g., submarine) 102 is coupled by a wired data communication link 104 to a DS-SS UWB transmitter 106 located at or near the water's surface. For example, data communication link 104 can be an anti-tamper type of data communications cable, which is tethered to underwater platform 102 at one end, and to a flotation device attached to DS-SS UWB transmitter 106 at the other end. Thus, the underwater platform 102 can release the flotation device including DS-SS UWB transmitter 106 when transmission and dissemination of the collected data is to occur. Transmitter 106 transmits the collected data within an encrypted, encoded DS-SS UWB signal (e.g., indicated by the wavy line 108), which is received, decrypted and decoded by a DS-SS UWB receiver 110 for processing and analysis of the collected data at a remote site.

Figure 2:
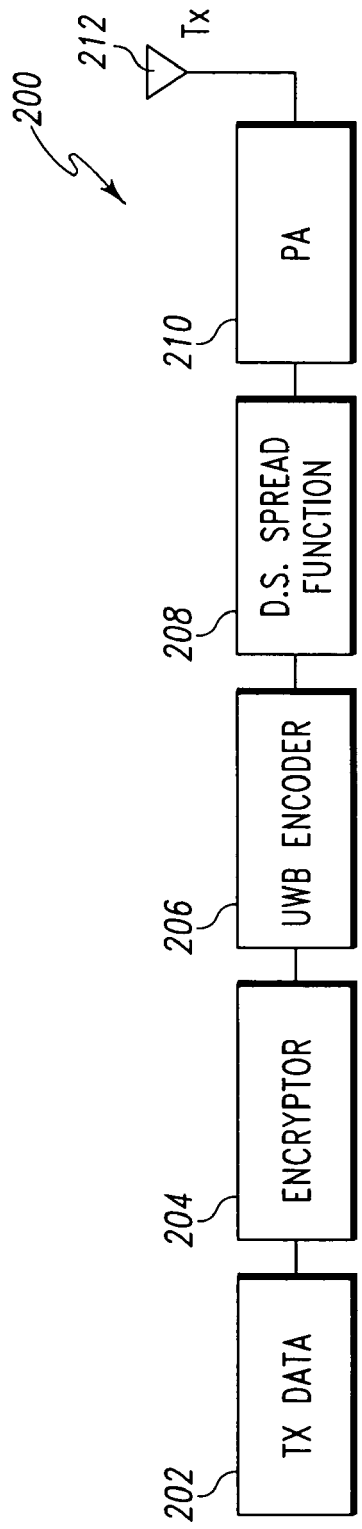
FIG. 2 depicts a block diagram of an example embodiment of a data transmitter system, which can be used to implement the DS-SS UWB transmitter in FIG. 1.

FIG. 2 depicts a block diagram of an example embodiment of a data transmitter system 200, which can be used to implement DS-SS UWB transmitter 106 in FIG. 1. For this example embodiment, data transmitter system 200 includes a data input unit 202 coupled to an input of a data encryption unit 204. In the example context of FIG. 1, data input unit 202 can be connected to wired data communication link 104, and receives a serial, binary bit-stream of collected, dumped data from the underwater collection and/or distribution platform involved (e.g., platform 102). Data input unit 202 temporarily stores the received data in a suitable input buffer or register, converts the received data from a serial format to a suitable parallel format for digital processing, and couples the converted data to the input of data encryption unit 204. Data encryption unit 204 executes an appropriate data encryption algorithm (e.g., implemented in software and executed by a digital processor), which encrypts the collected data in accordance with the level of security required by the user of data transmitter system 200. For example, a suitable data encryption algorithm that can be used by data encryption unit 204 is a cryptographic encryption algorithm formulated in accordance with the Data Encryption Standard (DES), the PGP data encryption algorithm, etc.

For this example embodiment, data transmitter system 200 also includes a UWB encoder unit 206 coupled to data encryption unit 204. Essentially, a UWB transmission has a very large bandwidth (e.g., which lies within the radio frequency spectrum between 3.1 GHz and 10.6 GHz) and is composed of a plurality of high frequency (e.g., 1 GHz wide) wavelets or low energy pulses of approximately one nanosecond in duration. Essentially, UWB encoder 206 encodes the encrypted digital data received from data encryption unit 204 into a plurality of multi-phase or shape-modulated wavelets. For example, UWB encoder 206 can encode each wavelet to convey one bit of the encrypted data received from data encryption unit 204. As another example, UWB encoder 206 can encode each wavelet to convey a plurality of bits of the encrypted data received. Thus, UWB encoder 206 can generate a wavelet having a shape that conveys one bit of data, or a plurality of wavelets having shapes that convey multiple bits of data. In this regard, data transmitter system 200 also includes a DS spreading function unit 208 coupled to UWB encoder 206. Notably, for this example embodiment, UWB encoder 206 and DS spreading function unit 208 cooperatively generate each wavelet to represent a chip in a code sequence, and the code sequence is used to communicate one or more bits of the encrypted data received from data encryption unit 204.

More precisely, for this example embodiment, DS spreading function unit 208 includes a pseudo-noise (PN) code sequence generator (not shown), which is coupled to a modulator section (not shown) of UWB encoder unit 206. The PN code sequence generator generates a PN code sequence, which is modulated by the modulator section onto the encrypted data received from data encryption unit 204. The PN code sequence modulated signal is applied to a wave shaper of UWB encoder unit 206, which generates suitable DS-SS wavelets for transmission. The wavelets generated by UWB encoder 206 and DS spreading function unit 208 are coupled to a power amplifier unit 210, which suitably amplifies the wavelets for UWB transmission from a transmit antenna unit 212.

Figure 3:
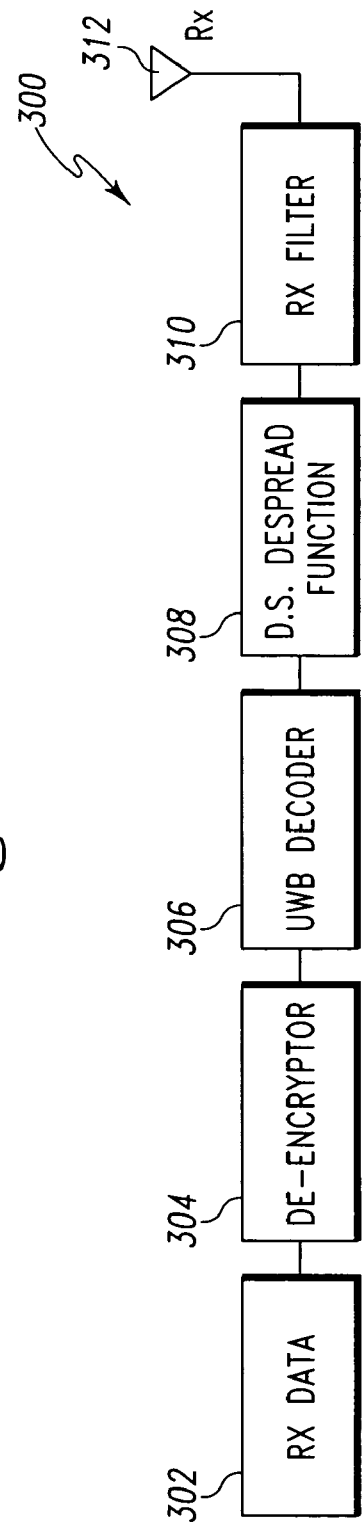
FIG. 3 depicts a block diagram of an example embodiment of a data receiver system, which can be used to implement the DS-SS UWB receiver in FIG. 1.

FIG. 3 depicts a block diagram of an example embodiment of a data receiver system 300, which can be used to implement DS-SS UWB receiver 110 in FIG. 1. For this example embodiment, data receiver system 300 includes a receiver antenna unit 312 coupled to a receiver filter unit 310. As such, filter unit 310 functions primarily as a wave shaping filter to condition the (wavelets) signals received via receiver antenna unit 312, and detect the encrypted, UWB encoded data from the received wavelets. For example, filter unit 310 also includes an envelope detector circuit to detect the received signals using a carrier having the same frequency as the transmitted signals. The envelope detector circuit thus produces a base-band pulse sequence representing the encrypted, UWB encoded data received.

For this example embodiment, receiver system 300 also includes a DS despreader function unit 308 coupled to filter unit 310. The DS despreader function unit 308 multiples the received signal by the same spreading pattern that was used for the spreading sequence of the transmitted wavelets involved. The output of DS despreader function unit 308 is a plurality of pulses, which are coupled to a UWB decoder unit 306. The UWB decoder unit 306 includes a pulse processing circuit (not shown), which determines the appropriate decoded signals that will result in data symbols that are the same as the data symbols that were communicated in the UWB transmission. The decoded symbols from UWB decoder unit 306 are coupled to a data decryption unit 304, which executes a suitable decryption algorithm that decrypts the received encrypted data to produce the raw collected amphibious data. For example, a suitable data decryption algorithm that can be used by data decryption unit 304 is a cryptographic decryption algorithm formulated in accordance with the Data Encryption Standard (DES), the PGP data encryption algorithm, etc. Obviously, the data decryption algorithm used for data decryption unit 304 should be associated with the encryption algorithm used for data encryption unit 204 shown in FIG. 2. The decrypted data from data decryption unit 304 is coupled to a receiver data unit 302, which conditions the received data for storage, analysis and/or display to a user.

Figure 4:
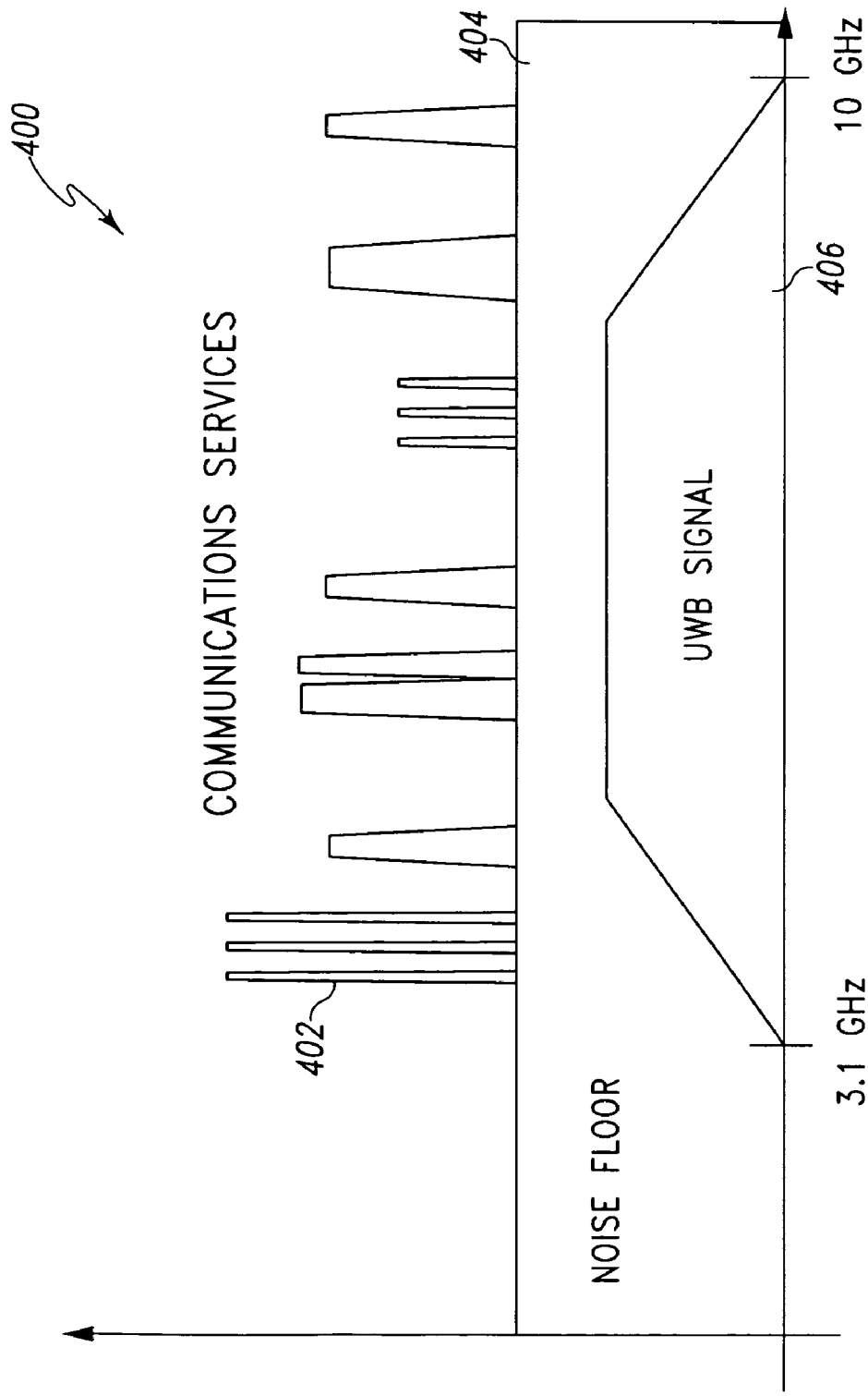
FIG. 4 depicts a graphical diagram that illustrates examples of the security features of UWB signals for wireless communications of collected amphibious data, in accordance with a preferred embodiment of the present invention.

FIG. 4 depicts a graphical diagram 400 that illustrates example security features of UWB signals for wireless communications of collected amphibious data, in accordance with a preferred embodiment of the present invention. For this example, diagram 400 plots power versus frequency for typical wireless communication services signals and UWB signals. As shown, a plurality of typical communication services signals (e.g., indicated generally as 402) are shown at their respective center frequencies within a 3.1 GHz-10.0 GHz band. All of these signals have power levels that are well above the noise floor (e.g., indicated generally as 404). Notably, however, a UWB signal 406 is shown spread across the entire 3.1 GHz-10.0 GHZ band, but its maximum power level is well below the noise floor. Thus, in accordance with principles of the present invention, encrypted transmissions of amphibious data using wireless UWB communications can be buried as secure "stealth" transmissions well within the noise environment. Consequently, the resulting encrypted UWB transmissions are highly immune to jamming and masked from eavesdropping attempts that may occur.

It is important to note that while the present invention has been described in the context of a fully functioning system for secure communication of collected amphibious data, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular system for secure communication of collected amphibious data.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A system for secure communication of collected data, comprising:
   a data dissemination subsystem, said data dissemination subsystem operable to store and disseminate collected data; and
   a transmitter subsystem coupled to said data dissemination subsystem, said transmitter subsystem operable to encrypt said disseminated collected data, encode said encrypted data to form a plurality of ultra wideband signals, spectrum spread said plurality of ultra wideband signals with a direct sequence spectrum spreading code, and transmit said spread plurality of ultra wideband signals.

2. The system of claim 1, further comprising:
   a receiver subsystem, said receiver subsystem operable to receive said spread plurality of ultra wideband signals, spectrum despread said received plurality of ultra wideband signals with a direct sequence spectrum despreading code associated with said direct sequence spectrum spreading code, decode said despread plurality of ultra wideband signals to form at least a portion of said encrypted collected data, and decrypt said at least a portion of said encrypted collected data.

3. The system of claim 2, wherein said transmitter subsystem and said receiver subsystem comprise an ultra wideband transceiver subsystem.

4. The system of claim 1, wherein said collected data comprises collected amphibious data.

5. The system of claim 1, wherein said data dissemination subsystem comprises an underwater data collection platform.

6. The system of claim 1, wherein said transmitter subsystem comprises a data encryption unit, a UWB encoder unit, a direct sequence spreader function unit, and a power amplifier unit.

7. The system of claim 2, wherein said receiver subsystem comprises a receiver filter unit, a direct sequence despreader function unit, a UWB decoder, and a data decryption unit.

8. The system of claim 1, wherein said transmitter subsystem includes means for encrypting said collected data.

9. The system of claim 1, wherein said transmitter subsystem includes means for spectrum spreading said collected data.

10. The system of claim 2, wherein said receiver subsystem includes means for spectrum despreading said collected data.

11. The system of claim 2, wherein said receiver subsystem includes means for decrypting said collected data.

12. A transmitter system for secure communication of collected data, comprising:
    means for encrypting disseminated collected data;
    means, coupled to said means for encrypting, for encoding said encrypted data to form a plurality of ultra wideband signals;
    means, coupled to said means for encoding, for direct sequence spectrum spreading said plurality of ultra wideband signals; and
    means, coupled to said means for direct sequence spectrum spreading, for transmitting said direct sequence spread plurality of ultra wideband signals.

13. A receiver system for secure communication of collected data, comprising:
    means for receiving direct sequence spread plurality of ultra wideband signals;
    means, coupled to said means for receiving, for spectrum despreading said received plurality of ultra wideband signals;
    means, coupled to said means for spectrum despreading, for decoding said despread plurality of ultra wideband signals to form at least a portion of said encrypted collected data; and
    means, coupled to said means for decoding, for decrypting said at least a portion of said encrypted collected data.

14. A method for secure communication of collected data, comprising the steps of:
    encrypting collected data;
    encoding said encrypted data to form a plurality of ultra wideband signals;
    direct sequence spectrum spreading said plurality of ultra wideband signals; and
    transmitting said spread plurality of ultra wideband signals.

15. The method of claim 14, wherein:
    the encrypting step is performed by a processor executing software instructions representing a data encryption algorithm;
    the encoding step is performed by a UWB encoder; and
    the spreading step is performed by a processor executing software instructions representing an algorithm for a direct sequence spectrum spreading function.

16. A method for secure communication of collected data, comprising the steps of:
    receiving a plurality of direct sequence spectrum spread ultra wideband signals;
    direct sequence spectrum despreading said received plurality of ultra wideband signals;
    decoding said despread plurality of ultra wideband signals to form encrypted collected data; and
    decrypting said encrypted collected data.

17. The method of claim 16, wherein:
    the receiving step is performed by a receiver filter unit;
    the direct sequence spectrum despreading step is performed by a processor executing software instructions representing an algorithm for a direct sequence spectrum despreading function;
    the decoding step is performed by a UWB decoder; and
    the decrypting step is performed by a processor executing software instructions representing a data decryption algorithm.

18. A computer program product, comprising:
    a computer-usable medium having computer-readable code embodied therein for configuring a computer processor, the computer program product comprising:
    a first executable computer-readable code configured to cause a computer processor to encrypt disseminated collected data;
    a second executable computer-readable code configured to cause a computer processor to encode said encrypted data to form a plurality of ultra wideband signals;

a third executable computer-readable code configured to cause a computer processor to direct sequence spectrum spread said plurality of ultra wideband signals; and a fourth executable computer-readable code configured to cause a computer processor to transmit said direct sequence spread plurality of ultra wideband signals.

19. The computer program product of claim 18, further comprising:

a fifth executable computer-readable code configured to cause a computer processor to receive said direct sequence spread plurality of ultra wideband signals;

a sixth executable computer-readable code configured to cause a computer processor to spectrum despread said received plurality of ultra wideband signals;

a seventh executable computer-readable code configured to cause a computer processor to decode said despread plurality of ultra wideband signals to form at least a portion of said encrypted collected data; and an eighth executable computer-readable code configured to cause a computer processor to decrypt said at least a portion of said encrypted collected data.

20. The computer program product of claim 18, wherein said disseminated collected data is received from an underwater data collection platform.

21. The computer program product of claim 18, wherein the first executable computer-readable code comprises code representing a data encryption algorithm.

* * * * *

UNITED STATES PATENT AND TRADEMARK OFFICE
CERTIFICATE OF CORRECTION

PATENT NO.       : 7,613,225 B1                                   Page 1 of 1
APPLICATION NO. : 11/352002
DATED            : November 3, 2009
INVENTOR(S)      : Haque et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 938 days.

Signed and Sealed this

Nineteenth Day of October, 2010

David J. Kappos
*Director of the United States Patent and Trademark Office*